US008817043B2

(12) United States Patent
Nemeth et al.

(10) Patent No.: US 8,817,043 B2
(45) Date of Patent: Aug. 26, 2014

(54) SYSTEM AND METHOD FOR SELECTIVE VIEWING OF A HIDDEN PRESENTATION WITHIN A DISPLAYED PRESENTATION

(75) Inventors: Edward Nemeth, Hermosa Beach, CA (US); David Crawford, Long Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1082 days.

(21) Appl. No.: 12/386,896

(22) Filed: Apr. 24, 2009

(65) Prior Publication Data

US 2010/0271396 A1    Oct. 28, 2010

(51) Int. Cl.
*G09G 5/00* (2006.01)
*G09G 5/14* (2006.01)

(52) U.S. Cl.
CPC ........................................ *G09G 5/14* (2013.01)
USPC .......................................................... 345/629

(58) Field of Classification Search
CPC ................................................ G09G 2340/10
USPC .......................................................... 345/629
See application file for complete search history.

(56) References Cited

U.S. PATENT DOCUMENTS

| 4,879,603 | A | 11/1989 | Berman |
| 5,537,476 | A | 7/1996 | Coteus |
| 5,613,004 | A | 3/1997 | Cooperman et al. |
| 5,614,920 | A | 3/1997 | Coteus |
| 5,619,219 | A | 4/1997 | Coteus |
| 5,629,984 | A | 5/1997 | Mcmanis |
| 5,748,763 | A | 5/1998 | Rhoads |
| 5,821,989 | A * | 10/1998 | Lazzaro et al. .................. 348/56 |
| 5,963,371 | A * | 10/1999 | Needham et al. ............. 359/464 |
| 6,021,196 | A | 2/2000 | Sandford et al. |
| 6,044,156 | A | 3/2000 | Honsinger et al. |
| 6,529,209 | B1 * | 3/2003 | Dunn et al. .................... 345/629 |
| 6,557,103 | B1 | 4/2003 | Boncelet et al. |
| 6,650,306 | B2 | 11/2003 | Yerazunis et al. |
| 6,806,930 | B2 | 10/2004 | Moia |
| 7,043,019 | B2 | 5/2006 | Tehranchi et al. |

(Continued)

FOREIGN PATENT DOCUMENTS

WO    WO 99/40476           8/1999
WO    WO 2004110773 A1 *    12/2004    ............... B41M 3/14

OTHER PUBLICATIONS

On the Analysis and Generalization of Extended Visual Cryptography Schemes, Authors: DaoShun Wang, Feng Yi, Xiaobo Li, Ping Luo, Yiqi Dai, (Submitted on Oct. 31, 2006).*

(Continued)

*Primary Examiner* — Javid A Amini
(74) *Attorney, Agent, or Firm* — Patterson & Sheridan, LLP

(57) ABSTRACT

There is provided a system and method for selective viewing of a hidden image within a displayed image. There is provided a method for providing a composite presentation, comprising displaying a plurality of elemental presentations including a first presentation and a second presentation to provide the composite presentation, wherein the displaying of the second presentation makes at least a first portion of the first presentation become unrecognizable to a human eye viewing the composite presentation without a use of a visual aid. This rendering of the first presentation as unrecognizable to the human eye may be accomplished through filtering techniques such as one or more of optical polarization, shuttering, depth of field alteration, light intensity alteration, light angle alteration, anaglyph filters, and other filtering techniques.

35 Claims, 4 Drawing Sheets

(56) References Cited

U.S. PATENT DOCUMENTS

| | | | |
|---|---|---|---|
| 7,046,440 | B1 | 5/2006 | Kaehr |
| 7,164,779 | B2 | 1/2007 | Yerazunis et al. |
| 7,319,755 | B2 | 1/2008 | Struyk |
| 7,609,451 | B1* | 10/2009 | Scarbrough ............ 359/619 |
| 7,796,753 | B2* | 9/2010 | Alasia et al. ............ 380/51 |
| RE43,362 | E* | 5/2012 | Yerazunis et al. ....... 382/100 |
| 2003/0028664 | A1 | 2/2003 | Tan et al. |
| 2003/0222901 | A1* | 12/2003 | Houck et al. ............ 345/738 |
| 2003/0233563 | A1 | 12/2003 | Kruse |
| 2004/0060976 | A1 | 4/2004 | Blazey et al. |
| 2004/0070588 | A1* | 4/2004 | Harrington et al. ...... 345/629 |
| 2005/0077351 | A1 | 4/2005 | De Jong |
| 2006/0256287 | A1 | 11/2006 | Jacobs |
| 2007/0040780 | A1 | 2/2007 | Gass |
| 2007/0164558 | A1* | 7/2007 | Wicker ................... 283/94 |
| 2008/0022128 | A1 | 1/2008 | Proudler et al. |
| 2008/0030800 | A1 | 2/2008 | Matsukawa et al. |
| 2008/0056529 | A1 | 3/2008 | Bhattacharjya |
| 2008/0058894 | A1 | 3/2008 | Dewhurst |
| 2010/0079585 | A1* | 4/2010 | Nemeth et al. .......... 348/54 |
| 2010/0225751 | A1* | 9/2010 | Nemeth .................. 348/58 |
| 2011/0264922 | A1 | 10/2011 | Beaumont et al. |
| 2012/0069139 | A1* | 3/2012 | Basso et al. ............ 348/14.16 |
| 2013/0172048 | A1 | 7/2013 | Rodriguez et al. |

OTHER PUBLICATIONS

Theoretical Computer Science 250 (2001) 143-161 "Extended capabilities for visual cryptography" ;Giuseppe Ateniese;1, Carlo Blundo; , Alfredo De Santis, Douglas R. Stinson.*

Haibo Zhang, Xiaofei Wang, Wanhua Cao, Youpeng Huang "Visual Cryptography for General Access Structure by Multi-pixel Encoding with Variable Block Size"; 2008 International Symposium on Knowledge Acquisition and Modeling.2008 IEEE.*

Karagosian, Michael, "Digital 3D—In a Theatre Near You?", INS Asia Magazine (Aug. 2005) <http://mkpe.com/publications/d-cinema/insasia/3d.php>.

Hou Young-Chang, "Visual cryptography for color images," Dept. of Information Management, National Central University, Jung Li, Taiwan 320, ROC, Pattern Recognition 36 (2003), pp. 1619-1629.

Wang et al., "On the Analysis and Generalization of Extended Visual Cryptography Schemes," Department of Computer Science and Technology, Tsinghua University, Beijing, 100084, China, 2006.

Naor et al., "Visual cryptography," Department of Applied Math and Computer Science, Weizmann Institue, Rehovot, Israel, 1995.

Ateniese et al., "Extended Capabilities for Visual Cryptography," Theoretical Computer Science 250 (2001) pp. 143-161.

Garera, Sujata, "Secret Sharing & Visual Cryptography," Lecture Slides, 650.470—Basics of Applied Cryptography and Network Security, Johns Hopkins University, Fall 2008, presented on Nov. 25, 2008 (available at: http://cs.jhu.edu/~sdoshi/crypto/lecture19.pdf).

Office Action, U.S. Appl. No. 12/617,602 dated Feb. 28, 2013.

Final Office Action, U.S. Appl. No. 12/617,602 dated Aug. 9, 2013.

\* cited by examiner

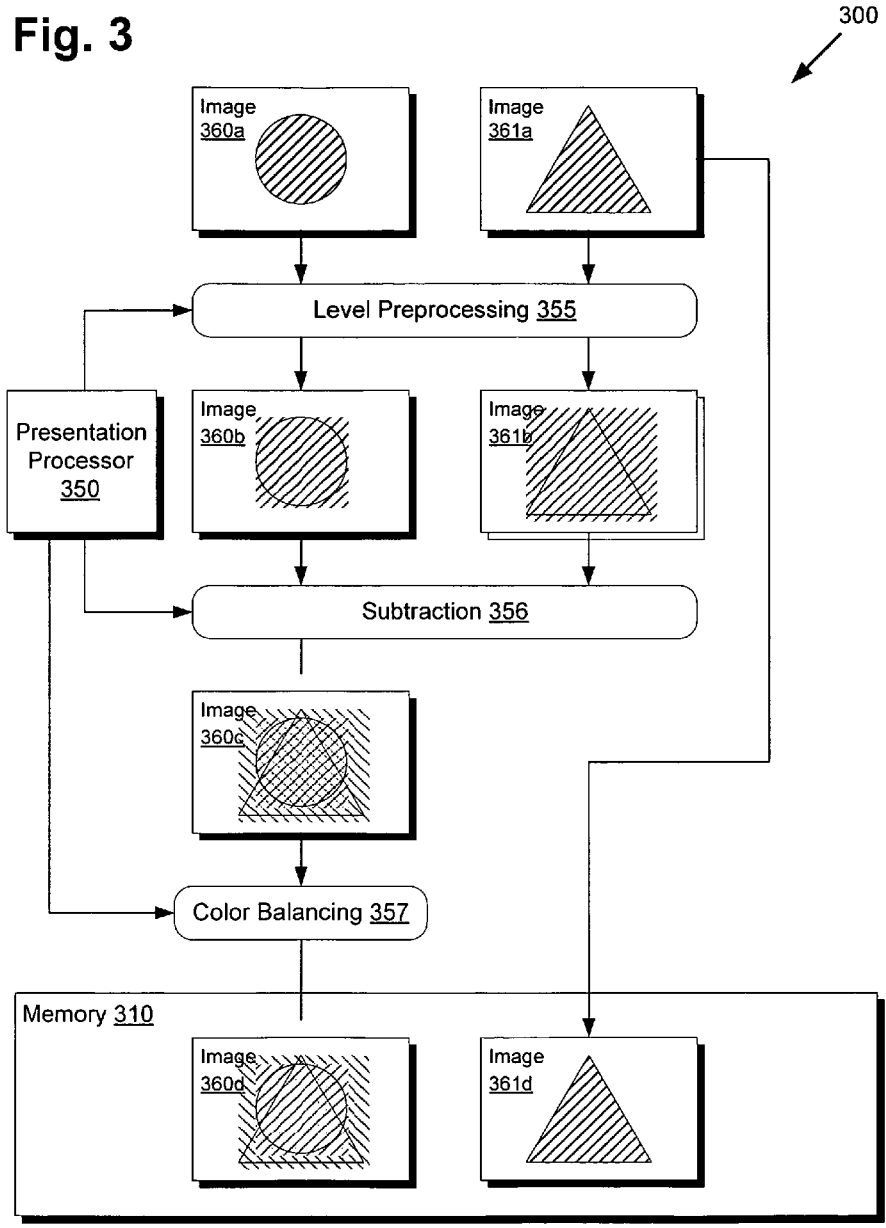

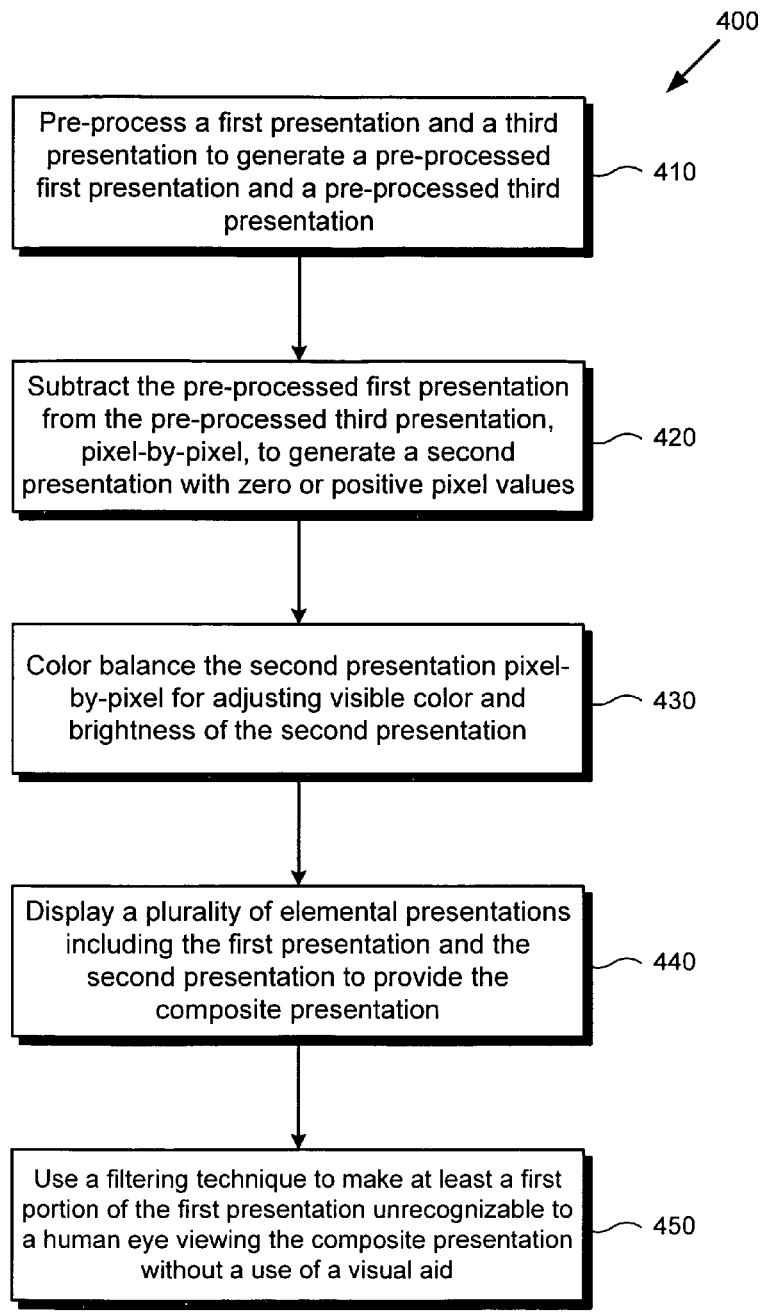

SYSTEM AND METHOD FOR SELECTIVE VIEWING OF A HIDDEN PRESENTATION WITHIN A DISPLAYED PRESENTATION

BACKGROUND OF THE INVENTION

1. Field of the Invention

The present invention relates generally to visual presentations. More particularly, the present invention relates to visual presentations revealed in a selective manner.

2. Background Art

Providing customized and personalized visual presentations for users is an effective approach for enhancing user enjoyment and providing emotional bonds to content that may otherwise be generic and less compelling. For example, personalized signs and displays can proclaim a special personal occasion such as a birthday, anniversary, marriage proposal, or another event. Personalized content could also tie-in to user preferences, such as a favorite character. Customized messages and images directed to select audiences can also support various scripted walkthroughs and targeted activities, such as secret messages and clues for a kid's detective game, unique encouraging messages or awards for individual players, and global tie-ins with popular characters, entertainment personalities, and media programs.

Although publicly viewable customized and personalized visual presentations may be appropriate for some situations, other situations may call for more discreet or selective presentations, viewable only by a select person or group of people. However, it is often difficult to achieve this goal in a cost effective and practical manner, particularly if accommodating a large group of people, or if supporting several customized variations and different groups of people.

Accordingly, there is a need to overcome the drawbacks and deficiencies in the art by providing an efficient way to reveal visual presentations in a selective manner.

SUMMARY OF THE INVENTION

There are provided systems and methods for selective viewing of a hidden presentation, such as still images, colors, animated images, movie clips, streaming video, real-time rendered video games and/or live feeds, within a displayed presentation, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 presents a system for preparing presentations for selective viewing of a hidden presentation within a displayed presentation, according to one embodiment of the present invention; and FIG. 4 shows a flowchart describing the steps, according to one embodiment of the present invention, by which a composite presentation is displayed such that a displayed presentation is seen by the naked eye and a hidden presentation is seen through a visual aid.

DETAILED DESCRIPTION OF THE INVENTION

The present application is directed to a system and method for selective viewing of a hidden presentation within a displayed presentation. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1A:
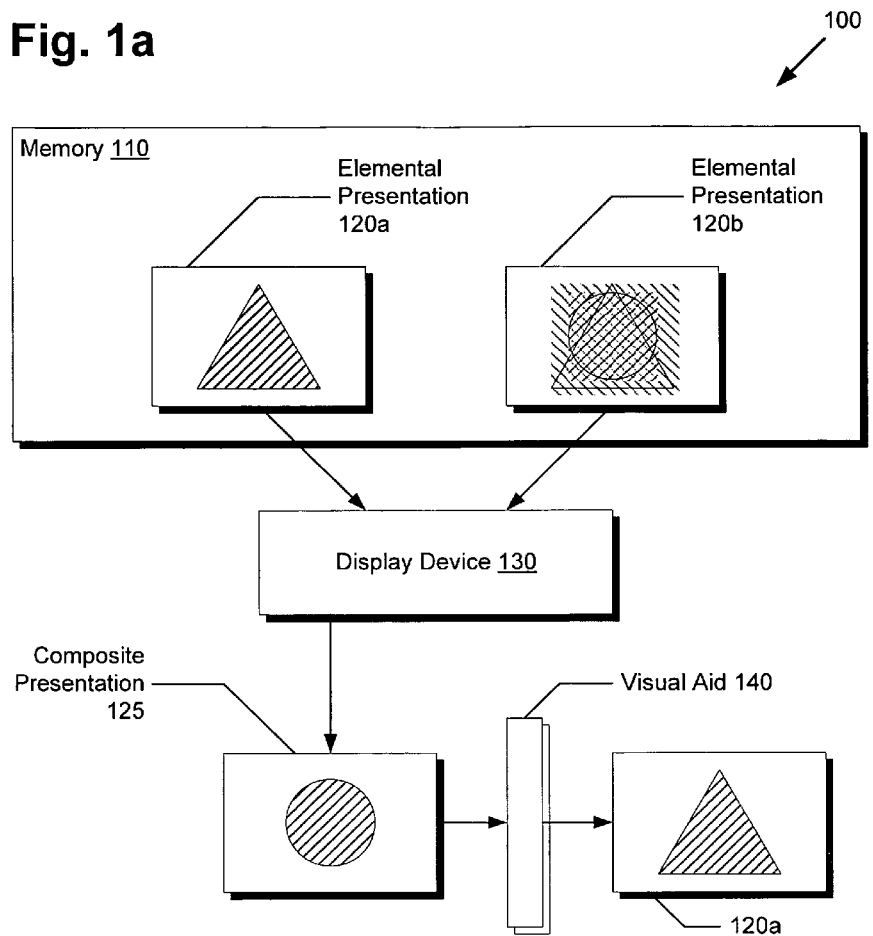
FIG. 1a presents a system for selective viewing of a hidden presentation within a displayed presentation, according to one embodiment of the present invention.

FIG. 1a presents a system for selective viewing of a hidden presentation within a displayed presentation, according to one embodiment of the present invention. Diagram 100 of FIG. 1a includes memory 110, display device 130, composite presentation 125, visual aid 140, and elemental presentation 120a. Memory 110 includes elemental presentations 120a-120b.

Memory 110 may comprise any type of digital storage media, such as flash memory, DRAM, a hard disk drive, optical media, or another storage device. Display device 130 may comprise any device capable of displaying a visual presentation, such as a projector, a video screen, printed materials, and other visual presentation devices. Memory 110 is shown in FIG. 1a pre-populated with elemental presentations 120a-120b. In FIG. 1a, elemental presentation 120a is represented by an abstracted image of a triangle, whereas elemental presentation 120b is represented by an abstracted image of an inverse of elemental presentation 120a combined with a circle. The inverted triangle is represented by the reversed direction of the shaded lines within the triangle of elemental presentation 120b. When elemental presentations 120a-120b are processed through display device 130, the end result may look visually similar to composite presentation 125, or the combination of elemental presentations 120a-120b. Since elemental presentation 120b includes an inversed image of elemental presentation 120a, they combine to cancel the triangle out, leaving only the circle as appearing in composite presentation 125.

Additionally, since composite presentation 125 is actually comprises a combination of elemental presentations 120a-120b, display device 130 can use a filtering technique to make at least a portion of elemental presentation 120a unrecognizable to a human eye viewing composite presentation 125 without using visual aid 140. In other words, display device 130 is configured such that visual aid 140 is enabled to mask some portion of elemental presentation 120a that comprises composite presentation 125, where the mask can be revealed through visual aid 140. To accomplish this, display device 130 may utilize filtering techniques such as one or more of optical polarization, shuttering, depth of field alteration, light intensity alteration, light angle alteration, anaglyph filters, and other filtering techniques. Using one of these filtering techniques, display device 130 can distinctly present elemental presentations 120a-120b even though they visually combine into composite presentation 125 to the naked eye. For example, by applying opposite orthogonal polarization angles to elemental presentations 120a-120b outputting from display device 130, visual aid 140 can isolate a desired elemental presentation by only allowing a particular polarization angle to pass light through and blocking opposite orthogonal polarization angles. For example, visual aid 140 may comprise a head-mounted element, such as glasses, goggles, or visors, or a stationary installation such as a specially treated transparent wall, window, windshield, or viewing portal.

While abstract static shapes are used to illustrate the present example, alternative embodiments may use other presentations, such as still images, photographs, artwork, written messages, solid colors and patterns. For example, a composite presentation matching a projected surface might be utilized, effectively creating a pattern indistinguishable from the surrounding background to the human eye. To give a further example, a pattern of a solid white color might be projected onto a background of a solid white colored wall, effectively blending into the wall. Since the pattern is actually part of a composite presentation, by using a properly configured visual aid, a hidden presentation might be viewable. Otherwise, to the naked human eye, the solid white colored wall may seem completely featureless, even though a composite presentation is being projected onto the wall.

Figure 1B:
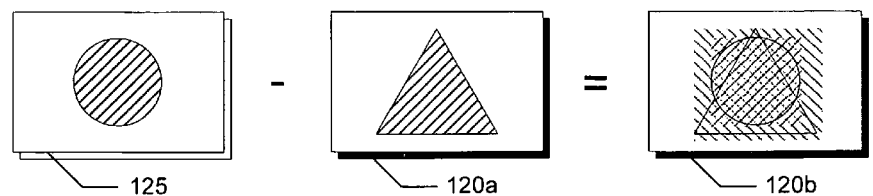
FIG. 1b presents a system of logical relationships between presentation elements, according to one embodiment of the present invention.

Presentations may be one of more of still images, colors, animated images, movie clips, streaming video, real-time rendered video games and live feeds. Since composite presentation 125 relies on elemental presentations 120a-120b having a certain logical relationship as shown in FIG. 1b, this logical relationship may need to be resolved by video frame pre-calculations for pre-rendered content, or video frame calculations on the fly for real-time presentations. In this case, display device 130 may be supplemented with a sufficiently capable processor to support the necessary calculations.

FIG. 1b presents a system of logical relationships between presentation elements, according to one embodiment of the present invention. Diagram 100 of FIG. 1b includes composite presentation 125 and elemental presentations 120a-120b.

As shown by FIG. 1b, subtracting elemental presentation 120a from composite presentation 125 results in elemental presentation 120b. However, in a final implementation, there is no need to actually store composite presentation 125, as demonstrated by its absence within memory 110 of FIG. 1a. Thus, while composite presentation 125 may be used to derive elemental presentation 120b, it is not necessarily needed by display device 130 to support a system for selective viewing of a hidden presentation within a displayed presentation.

However, the relationship shown by FIG. 1b may make more explicit the intended function of the system shown by FIG. 1a. Composite presentation 125 may comprise a displayed presentation viewable to the displayed, whereas elemental presentation 120a may comprise a private or hidden presentation viewable only to a select audience having access to visual aid 140. Elemental presentation 120b is thus a kind of intermediary masking presentation that is configured to provide a desired composite presentation 125, or the displayed presentation, when combined via display device 130 with a desired elemental presentation 120a, or the hidden presentation. Thus, after generating content to be shown to the general public as composite presentation 125, and after generating content to be shown to private viewers through visual aid 140 as elemental presentation 120a, the masking presentation or elemental presentation 120b can be derived using the simple image subtraction relation depicted in FIG. 1b. In alternative implementations, various image processing steps may also be included to provide a higher quality end result, but the basic concept is still illustrated by the relationship shown in FIG. 1b.

Figure 2A:
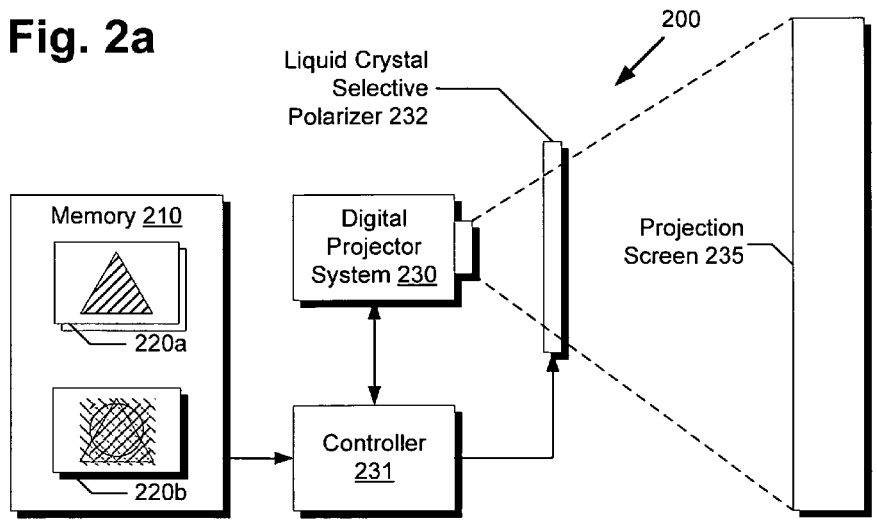
FIG. 2a presents an exemplary system for selective viewing of a hidden presentation within a displayed presentation, according to one embodiment of the present invention.

FIG. 2a presents an exemplary system for selective viewing of a hidden presentation within a displayed presentation, according to one embodiment of the present invention. Diagram 200 of FIG. 2a includes memory 210, digital projector system 230, controller 231, liquid crystal selective polarizer 232, and projection screen 235. Memory 210 includes elemental presentations 220a-220b. With regards to FIG. 2a, it should be noted that memory 210 corresponds to memory 110 from FIG. 1.

Diagram 200 of FIG. 2a focuses on an implementation using alternative frames with orthogonal polarization for use with polarized glasses. As previously discussed, one or more alternative filtering methods may also be utilized, such as shuttering, depth of field alteration, light intensity alteration, light angle alteration, and anaglyph filters. For example, instead of a single digital projector using quickly switching alternative frames with differing polarization, as shown by FIG. 2a, alternative embodiments might use multiple digital projectors having specific polarization angles to output concurrently to projection screen 235. Additionally, the visual aid may be something other than glasses, such as a transparent wall or a window. Any presentation system that can implement the concept illustrated by FIGS. 1a-1b as discussed above may be suitable for alternative embodiments.

Controller 231 may comprise a processor or microcontroller for accessing memory 210, driving digital projector system 230, and switching polarization states for liquid crystal selective polarizer 232. As shown in memory 210, elemental presentations 220a-220b are available for reading by controller 231. Controller 231 can transfer a particular elemental presentation to digital projector system 230 for displaying on projection screen 235, and can also concurrently change the polarization state for liquid crystal selective polarizer 232. An example sequence of images and polarization states are illustrated by the timeline of FIG. 2b.

Figure 2B:
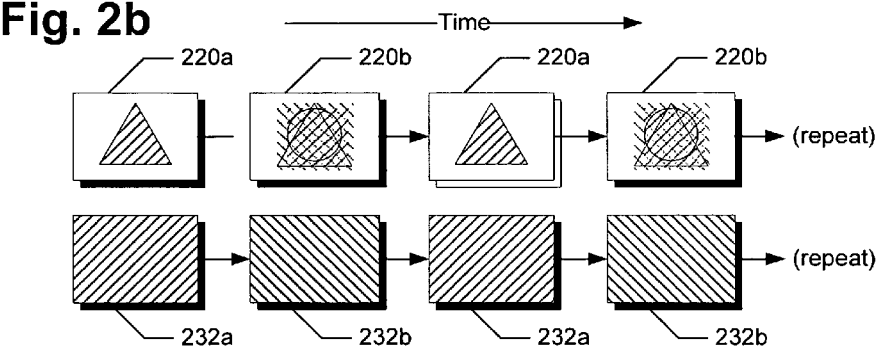
FIG. 2b presents, according to one embodiment of the present invention, a timeline for selective viewing of a hidden presentation within a displayed presentation, the timeline showing projection screen content and polarization states against time.

FIG. 2b presents, according to one embodiment of the present invention, a timeline for selective viewing of a hidden presentation within a displayed presentation, the timeline showing projection screen content and polarization states against time. Diagram 200 of FIG. 2b includes elemental presentations 220a-220b and liquid crystal selective polarizers 232a-232b.

As shown by diagram 200 of FIG. 2b, as time progresses, the image shown on projection screen 235 alternates between a first time interval displaying elemental presentation 220a and a second time interval displaying elemental presentation 220b. Additionally, the elemental presentations are configured such that they are orthogonal to each other in terms of polarization angles, as shown by the alternating polarization states of liquid crystal selective polarizer 232a in one direction and 232b in the other direction. This orthogonal polarization can be affected via liquid crystal selective polarizer 232, which can be attached directly in front of digital projector system 230 to apply a particular angle of polarization to any incoming picture signal, with controller 231 also synchronizing frame transitions with digital projector system 230. Additionally, this polarization might only be applied to a portion of the incoming light signal. The timeline shown in FIG. 2b may represent only a very short period of time, as digital projector system 230 may run at a very high refresh rate such as 120 hertz or higher to avoid flickering artifacts and other unwanted anomalies. Additionally, as indicated in FIG. 2b, the sequence may repeat as time progresses beyond the four initial frames shown.

Figure 2C:
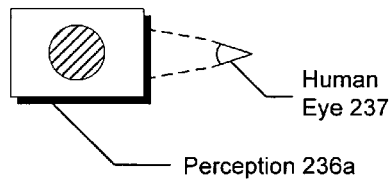
FIGS. 2c and 2d present human perceptions by naked eye or by using a visual aid for perceiving an exemplary system for selective viewing of a hidden presentation within a displayed presentation, according to one embodiment of the present invention.
Figure 2D:
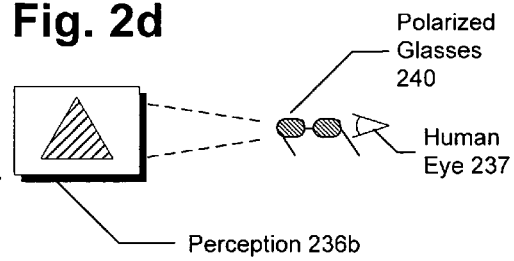

FIGS. 2c and 2d present human perceptions by naked eye or by using a visual aid for perceiving an exemplary system for selective viewing of a hidden presentation within a displayed presentation, according to one embodiment of the present invention. Diagram 200 of FIG. 2c includes perception 236a and human eye 237. Diagram 200 of FIG. 2d includes perception 236b, human eye 237, and polarized glasses 240.

As shown by FIG. 2c, human eye 237 unaided by visual aids can only perceive perception 236a, which shows a composite presentation of elemental presentations 220a-220b corresponding to composite presentation 125 of FIG. 1a. In other words, the general public, lacking any special visual aids, can only perceive the composite presentation or displayed image. On the other hand, as shown by FIG. 2d, human eye 237 aided by polarized glasses 240 can perceive perception 236b instead, which shows elemental presentation 220a, or the private or hidden presentation. As previously discussed, other methods besides polarization might be used. For example, polarized glasses 240 might be replaced with shutter glasses that respond to radio frequency signals emitted by controller 231. In this case, the shutter glasses may block the transmission of light during every second time interval or even time interval shown in the timeline of FIG. 2b, resulting in a perception similar to perception 236b. Controller 131 may precisely emit the radio frequency signals to correspond to these time intervals where the shutter glasses should block the transmission of light, by for example applying voltage to liquid crystals.

In this manner, a general purpose presentation for the public can be shown to all viewers as the displayed presentation, whereas a particular person or group of people having the proper visual aids can see the hidden presentation, which may be customized and personalized especially for that particular person or group of people. In this manner, after an initial setup and investment in an equipment system similar to that shown in FIG. 2a, low cost visual aids such as polarized glasses can be provided for cost effective personalized and customized presentations to particular persons.

Additionally, this concept might be extended to be applicable for several different groups of people by having several elemental presentations comprise a composite presentation rather than using only two elemental presentations. As long as a suitable filtering technique is utilized, corresponding visual aids can be provided for each of the several groups of people, where each visual aid is configured to perceive only a single elemental presentation. Alternatively, each visual aid may perceive only portions of an elemental presentation, or a particular grouping of elemental presentations, as there is no limitation that the visual aid must show a single elemental presentation in its entirety.

In this manner, by matching a particular visual aid to a particular presentation for a particular group of people, presentations can be personalized and customized to any number of different groups, with a publicly viewable presentation also concurrently viewable by the naked eyes of the general public. As previously discussed, this capability can be leveraged to provide a broad range of possibilities, such as personalized messages, character or personality tie-ins, scripted walkthroughs, and other events. Moreover, by utilizing a system for selective viewing of a hidden presentation within a displayed presentation as described above, implementation costs can be reduced by using low cost commodity visual aids for the users of the system, rather than creating a custom and potentially expensive presentation system for each separate audience.

FIG. 3 presents a system for preparing presentations for selective viewing of a hidden presentation within a displayed presentation, according to one embodiment of the present invention. Environment 300 of FIG. 3 includes presentation processor 350, level preprocessing 355, subtraction 356, color balancing 357, and presentations, e.g. images 360a-360d, 361a, 361b, and 361d. With regards to FIG. 3, it should be noted that image 360d corresponds to elemental presentation 120b from FIG. 1, and that image 361d corresponds to elemental presentation 120a.

Although FIG. 1b presented the logical relationship between the elemental presentations and the composite presentation, FIG. 3 provides step by step detail as to how to derive a second elemental presentation to be used as an intermediary masking image given a first and a third elemental presentation, where the third elemental presentation may correspond to a displayed image to be shown to the general public, and the first elemental presentation may correspond to the private or hidden image. In FIG. 3, image 360a corresponds to the third elemental presentation or displayed image, image 361a corresponds to the first elemental presentation or hidden image, and image 360d corresponds to the second elemental presentation or the intermediary masking image.

Presentation processor 350 may comprise, for example, a general-purpose processor executing a presentation manipulation program, or a special purpose microcontroller for manipulating presentations. As shown in FIG. 3, presentation processor 350 may provide a number of presentation manipulation functions, such as level processing 355, subtraction 356, and color balancing 357, which can all operate pixel-by-pixel for given input presentations. The end results of the presentation processing done by presentation processor 350 may then be stored in memory 310 for future use by, for example, the systems described above for selective viewing of a hidden presentation within a displayed presentation.

Starting from the top, both image 360a or the third presentation and image 361a or the first presentation are pre-processed through level preprocessing 355 to generate image 360b or a pre-processed third presentation and image 361b or a pre-processed first presentation. Level preprocessing 355 may, for example, adjust brightness, contrast, gamma, value levels, bit depth, and other image properties such that the resulting pre-processed images, when processed through subtraction 356, result in a plurality of pixel values greater than or equal to zero, or in other words zero or positive pixel values. This step may be considered a form of normalization to prepare the images for the eventual subtraction 356 such that negative values will not result. If negative values do result, they would need to be clipped to zero, adversely affecting image dynamics and quality.

Next, the actual subtraction 356 is carried out by subtracting image 361b, or the pre-processed first presentation, from image 360b, or the pre-processed third presentation, to generate image 360c, or a second presentation. This step can be carried out by subtracting color elements pixel-by-pixel for each pixel of image 361b from corresponding pixels of image 360b. Since level preprocessing 355 was already previously applied to image 360b and image 361b, there is no risk of negative underflows resulting from subtraction 356. The output result is image 360c, or the second presentation. As previously discussed, the subtraction of image 361b is represented by the reversed direction of the shading lines within image 360c.

Next, image 360c or the second presentation is processed through color balancing 357 pixel-by-pixel for adjusting visible color and brightness of the second presentation. Due to non-linear effects in the display system or the human eye, viewers may perceive incorrect colors. Color balancing 357 may adjust image 360c to compensate for these non-linear effects, restoring original color fidelity. Although this step may not be strictly necessary, it may enhance the viewing experience by providing the most accurate color reproduction. The result of color balancing 357 is image 360d, which corresponds to elemental presentation 120b from FIG. 1. Additionally, image 361d may simply be copied from the original image 361a, which corresponds to elemental presentation 120a from FIG. 1. Thus, memory 310 is now fully populated with elemental presentations for supporting a system of selective viewing of a hidden presentation within a displayed presentation, as described above.

Additionally, while the steps performed by presentation processor 350 including level processing 355, subtraction 356, and color balancing 357 are shown as discrete steps in FIG. 3, alternative embodiments may perform two or more of these steps simultaneously for faster processing through parallel calculations. For example, presentation processor 350 might comprise a multi-core processor capable of executing several processing threads simultaneously. This may be particularly important if image 360a and image 361a are live feeds or animated images rather than still frames, as the presentation processing must be completed quickly in real-time to accommodate video streams with high framerates.

FIG. 4 shows a flowchart describing the steps, according to one embodiment of the present invention, by which a composite presentation is displayed such that a displayed presentation is seen by the naked eye and a hidden presentation is seen through a visual aid. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and diagram 300 of FIG. 3, step 410 of flowchart 400 comprises presentation processor 350 pre-processing image 361a and image 360a through level preprocessing 355 to generate image 361b and image 360b. As previously discussed, level preprocessing 355 may adjust brightness, contrast, gamma, value levels, bit depth, and other image properties to output images 360b and 361b.

Referring to step 420 of flowchart 400 in FIG. 4 and diagram 300 of FIG. 3, step 420 of flowchart 400 comprises presentation processor 350 subtracting image 361b from image 360b via subtraction 356 pixel-by-pixel to generate image 360c with zero or positive pixel values. As previously discussed, since step 410 already prepared the input images for positive values after subtraction 356, subtraction 356 may apply a simple no-bounds checking subtraction operation for each pixel of image 361b from each corresponding pixel from image 361b.

Referring to step 430 of flowchart 400 in FIG. 4 and diagram 300 of FIG. 3, step 430 of flowchart 400 comprises presentation processor 350 color balancing image 360c generated from step 420 for adjusting visible color and brightness of image 360c. As previously discussed, due to non-linear effects in the display system or the human eye, color corrections may be necessary for optimal image quality. Steps 410-430 might also be combined into combination parallel steps to accelerate processing time as well, as previously discussed. At the end of step 430, image 360d and image 361d may be stored in memory 310.

Referring to step 440 of flowchart 400 in FIG. 4 and diagram 200 of FIG. 2a, step 440 of flowchart 400 comprises digital projector system 230 displaying a plurality of elemental presentations including elemental presentations 220a-220b, which correspond to images 361d and 360d derived from step 430. Controller 231 may, for example, retrieve elemental presentations 220a-220b from memory 210 to output via digital projector system 230 as projected light signals for displaying onto projection screen 235. In order to display all the elemental presentations, digital projector system 230 might rapidly alternative between the available elemental presentations, or digital projector system 230 might comprise multiple digital projectors outputting simultaneously.

Referring to step 450 of flowchart 400 in FIG. 4 and diagram 200 of FIGS. 2a-2d, step 450 of flowchart 400 comprises controller 231 using a polarization filtering technique via liquid crystal selective polarizer 232 to make at least a portion of elemental presentation 120a unrecognizable to human eye 237 viewing a composite presentation shown on projection screen 235 without a use of polarized glasses 240. This polarization filtering technique has been described in detail above with the discussion of FIG. 2a-2d, where liquid crystal selective polarizer 232 applies opposite orthogonal polarization angles to alternate frames, as shown by FIG. 2b. In the case of the example illustrated by FIG. 2a, the polarization filtering technique makes the entire portion of elemental presentation 120a unrecognizable to human eye 237, as shown by perception 236a. However, with the aid of polarized glasses 240, human eye 237 can perceive the entirety of elemental presentation 120a as perception 236b. As previously discussed, step 450 might be accomplished using other methods such as shuttering, and step 450 may render only a portion of an elemental presentation unrecognizable, or may render several elemental presentations unrecognizable. In this manner, selective viewing of a hidden presentation within a displayed presentation is enabled by the systems described above.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of providing a composite presentation, the method comprising:
   receiving a first presentation and a second presentation in a plurality of presentations, wherein each of the first presentation and the second presentation comprises one or more images that are human-perceptible;
   subtracting the first presentation from the second presentation on a pixel-by-pixel basis to obtain a difference presentation, wherein the difference presentation does not present any human-perceptible images; and
   displaying, via a processor, the first presentation and the difference presentation to reproduce the composite presentation, wherein the composite presentation is human-perceptible as the second presentation;
   wherein at least a first portion of the first presentation is selectively revealed to a viewer when viewing the composite presentation via a visual aid.

2. The method of claim 1, wherein the first presentation comprises a presentation of a color.

3. The method of claim 1, wherein the displaying of the difference presentation renders the first portion of the first presentation imperceptible to the human eye by employing a filtering technique including at least one of polarization, shuttering, depth of field alteration, light intensity alteration and light angle alteration.

4. The method of claim 1, wherein prior to the displaying, the method further comprises:
   pre-processing the first presentation and a third presentation in the plurality of presentations to generate a pre-processed first presentation and a pre-processed third presentation; and
   subtracting the pre-processed first presentation from the pre-processed third presentation, on a pixel-by-pixel basis, to generate the difference presentation, wherein a plurality of pixels have values greater than or equal to zero.

5. The method of claim 4, wherein after the subtracting and prior to the displaying, the method further comprises:
   color-balancing the difference presentation on a pixel-by-pixel basis for adjusting visible color and brightness of the difference presentation.

6. The method of claim 5, wherein two or more of the pre-processing, the subtracting and color-balancing are performed simultaneously.

7. The method of claim 1, wherein the composite presentation comprises a pattern indistinguishable to the human eye from a surrounding background.

8. The method of claim 7, wherein the pattern and the surrounding background both comprise a solid white color.

9. The method of claim 1, further comprising a third presentation in the plurality of presentations.

10. The method of claim 9, further comprising displaying the third presentation renders a second portion of the first presentation imperceptible to the human eye viewing the composite presentation without the visual aid.

11. The method of claim 9, wherein the displaying of the difference presentation and the third presentation renders the first portion of the first presentation become imperceptible to the human eye viewing the composite presentation without the visual aid.

12. The method of claim 9, wherein the displaying of the first presentation renders at least a first portion of the third presentation become imperceptible to the human eye viewing the composite presentation without the visual aid.

13. The method of claim 1, wherein one or more of the presentations in the plurality of presentations comprise animated images.

14. The method of claim 1, wherein one or more of the presentations in the plurality of presentations comprise still images.

15. The method of claim 1, wherein the composite presentation comprises an animated image.

16. The method of claim 1, wherein the composite presentation comprises a still image.

17. The method of claim 1, wherein the displaying of the first presentation and the difference presentation is performed simultaneously.

18. The method of claim 17, wherein the displaying of the presentations in the plurality of presentations is performed such that at least a portion of one or more of the presentations in the plurality of presentations is rendered imperceptible by an optical polarization and/or anaglyph filter.

19. The method of claim 1, wherein the displaying of the first presentation and the difference presentation is performed sequentially for a first time interval and a second time interval, respectively.

20. The method of claim 19, wherein the displaying of the presentations in the plurality of presentations is performed such that at least a portion of one or more of the presentations in the plurality of presentations is rendered imperceptible by a shutter mechanism blocking a transmission of light during the second time interval.

21. The method of claim 1, wherein prior to the displaying, the method further comprises:
   polarizing at least a portion of the first presentation in a first direction; and
   polarizing at least a portion of the difference presentation in a second direction.

22. A system for providing a composite presentation, the system comprising:
   a presentation processor configured to:
      receive a first presentation and a second presentation in a plurality of presentations, wherein each of the first presentation and the second presentation comprises one or more images that are human-perceptible, and
      subtract the first presentation from the second presentation on a pixel-by-pixel basis to obtain a difference presentation, wherein the difference presentation does not present any human-perceptible images; and
   a display device configured to display the first presentation and the difference presentation to reproduce the composite presentation, wherein the composite presentation is human-perceptible as the second presentation;
   wherein at least a first portion of the first presentation is selectively revealed to a viewer when viewing the composite presentation via a visual aid.

23. The system of claim 22, wherein the display device is configured to render the first portion of the first presentation imperceptible to the human eye by employing a filtering technique including at least one of polarization, shuttering, depth of field alteration, light intensity alteration and light angle alteration.

24. The system of claim 22, wherein the display device is configured to display the first presentation and the difference presentation simultaneously.

25. The system of claim 24, wherein the display device is configured to display the presentations in the plurality of presentations such that at least a portion of one or more of the presentations in the plurality of presentations is rendered imperceptible by an optical polarization and/or anaglyph filter.

26. The system of claim 22, the display device is configured to display the first presentation and the difference presentation sequentially for a first time interval and a second time interval, respectively.

27. The system of claim 26, wherein the display device is configured to display the presentations in the plurality of presentations such that at least a portion of one or more of the presentations in the plurality of presentations is rendered imperceptible by a shutter mechanism blocking a transmission of light during the second time interval.

28. The system of claim 22 further comprising:
a polarizer configured to polarize at least a portion of the first presentation in a first direction and polarize at least a portion of the difference presentation in a second direction, prior to the display device displaying the first presentation and the difference presentation.

29. A method of providing a composite image, the method comprising:
receiving a first image and a second image in a plurality of images, wherein each of the first image and the second image comprises an image that is human-perceptible;
subtracting the first image from the second image on a pixel-by-pixel basis to obtain a difference image, wherein the difference image does not present a human-perceptible image; and
displaying, via a processor, the first image and the difference image to reproduce the composite image, wherein the composite image is human-perceptible as the second image;
wherein at least a first portion of the first image is selectively revealed to a viewer when viewing the composite image via a visual aid.

30. The method of claim 29, wherein one or more images in the plurality of images comprise animated images.

31. The method of claim 29, wherein the displaying renders the first portion of the first image imperceptible to the human eye by employing a filtering technique including at least one of polarization, shuttering, depth of field alteration, light intensity alteration and light angle alteration.

32. The method of claim 29, wherein the displaying of the first image and the difference image is performed simultaneously.

33. The method of claim 32, wherein the displaying of the images in the plurality of images is performed such that at least a portion of one or more of the images in the plurality of images is rendered imperceptible by an optical polarization and/or anaglyph filter.

34. The method of claim 29, wherein the displaying of the first image and the difference image is performed sequentially for a first time interval and a second time interval, respectively.

35. The method of claim 34, wherein the displaying of the images in the plurality of images is performed such that at least a portion of one or more of the images in the plurality of images is rendered imperceptible by a shutter mechanism blocking a transmission of light during the second time interval.

* * * * *